United States Patent [19]

Chouanard et al.

[11] Patent Number: 5,220,600
[45] Date of Patent: Jun. 15, 1993

[54] HIGH-DENSITY CROSS-CONNECT BAY

[75] Inventors: Harvey Chouanard, Deephaven; Jeffrey Korkowski, Bloomington; Kevin Rademacher, Lakeville, all of Minn.

[73] Assignee: ADC Telecommunications, Inc., Minneapolis, Minn.

[21] Appl. No.: 719,687

[22] Filed: Jun. 25, 1991

Related U.S. Application Data

[63] Continuation of Ser. No. 652,298, Feb. 5, 1991, abandoned, which is a continuation of Ser. No. 436,344, Nov. 14, 1989, abandoned.

[51] Int. Cl.[5] .............................................. H04Q 1/14
[52] U.S. Cl. ..................... 379/327; 361/426; 361/428
[58] Field of Search ............... 379/326, 327, 328, 330, 379/331, 332; 361/426, 428, 425, 429, 417, 419, 420

[56] References Cited

U.S. PATENT DOCUMENTS

| | | | |
|---|---|---|---|
| 4,603,377 | 7/1986 | Kobayshi et al. | 379/327 X |
| 4,649,236 | 3/1987 | De Luca et al. | 379/327 |
| 4,665,546 | 5/1987 | Brey et al. | 379/327 |
| 4,737,985 | 4/1988 | De Luca et al. | 379/327 |

Primary Examiner—James L. Dwyer
Assistant Examiner—Ahmad F. Matar
Attorney, Agent, or Firm—Merchant, Gould, Smith, Edell, Welter & Schmidt

[57] ABSTRACT

A cross-connect panel for a high density digital signal cross-connect (DSX) bay is disclosed. The panel includes a plurality of cross-connect termination points grouped in an array which includes a plurality of horizontal spaced-apart rows. A plurality of troughs are defined between opposing rows. The rows are divided into two spaced-apart set. A second trough extends vertically through the height of the panel in vertical alignment with gaps defined between the spaced-apart sets. The vertical trough is offset from the plane of the horizontal troughs.

11 Claims, 3 Drawing Sheets

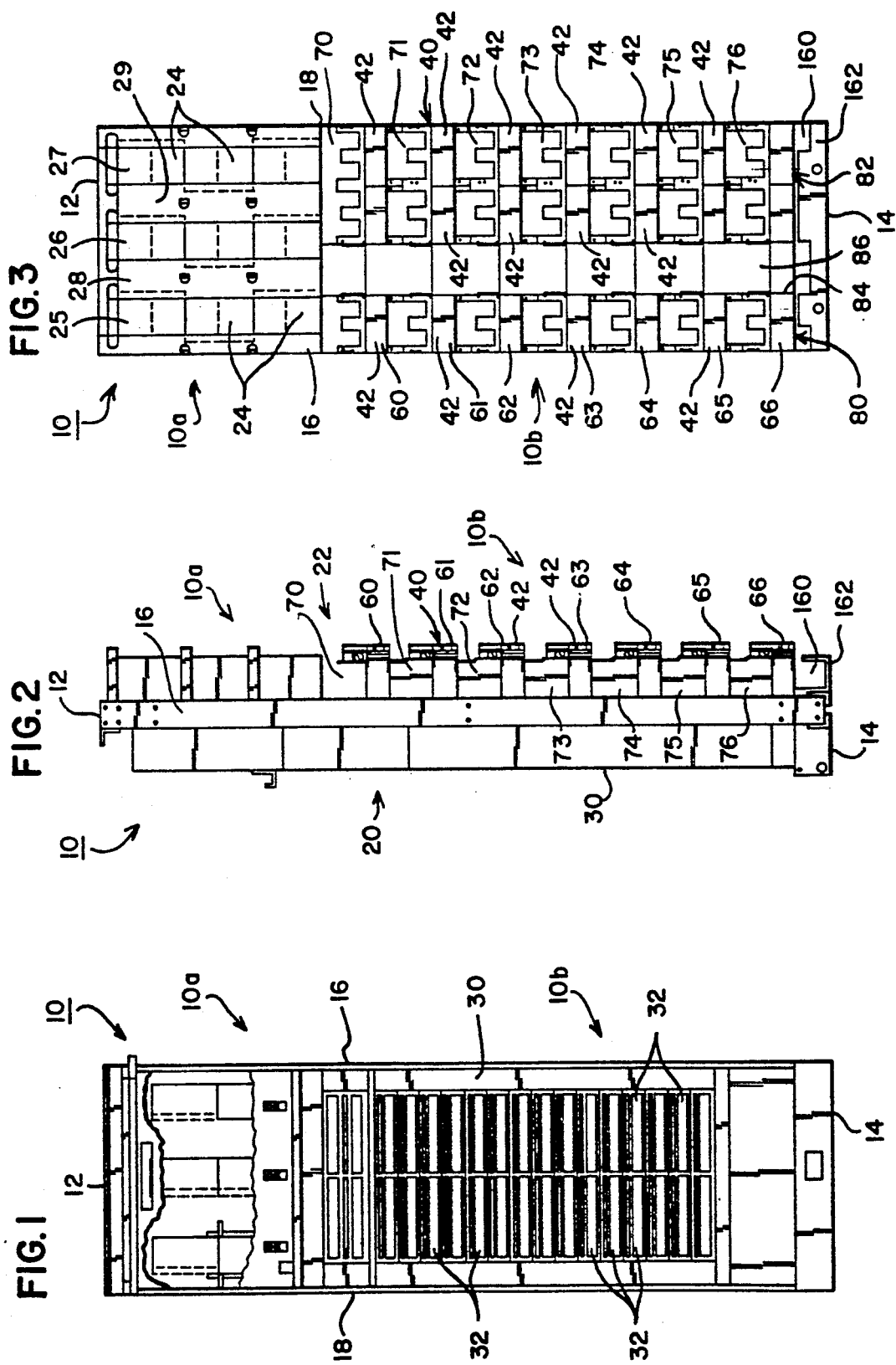

HIGH-DENSITY CROSS-CONNECT BAY

This is a continuation of application Ser. No. 07/652,298, filed Feb. 5, 1991, now abandoned, which is a continuation of application Ser. No. 07/436,344, filed Nov. 14, 1989, now abandoned.

BACKGROUND OF THE INVENTION

1. Field of the Invention

This invention pertains to the field of telephonic communications. More particularly, this invention pertains to a high density bay for providing cross-connection between telephonic communication circuits.

2. Description of the Prior Art

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well known and include a plurality of spring contacts for receiving tip-and-ring plugs. The jacks are commonly ganged in a common housing which is mounted on a frame or bay. The jacks are typically hard wired to wire termination pins which are mounted on a side of the bay opposite the jacks.

The amount of jacks or cross-connect points which are contained on a bay of given size is referred to as the density of a bay. As the cross-connect bay density increases, the management of telephone communication wires in the bay becomes increasingly complex. For high density DSX bays, wire management is critical.

Examples of a high density DSX bay are shown in U.S. Pat. Nos. 4,737,985 and 4,649,236. The DSX bays of U.S. Pat. Nos. 4,737,985 and 4,649,236 has a front face which carries a plurality of jack fields. The back face includes a plurality of horizontal spaced-apart rows of connector blocks (item 27 in FIG. 3 of U.S. Pat. No. 4,737,985). As shown in FIG. 3 of the aforesaid patent, the rear side of the connector bay includes upper and lower troughs 29, 30 through which wires may transverse in a horizontal path. Troughs 29, 30 are connected by a vertical trough 22 disposed along a side edge of the rear face of the panel. Horizontal troughs 25 in FIG. 3 of the aforesaid patent extend horizontally between the horizontal rows of connecting block 27. The horizontal rows 25 are generally coplanar with the vertical trough 22. (The coplanar arrangment is best shown in FIG. 4 of U.S. Pat. 4,649,236).

The common planar arrangement of the horizontal and vertical troughs of the high density bay of U.S. Pat. Nos. 4,737,985 and 4,649,236 results in interference of wires passing through tho intersection of horizontal and vertical troughs. This interference adversely impacts on the wire management of the bay and significantly reduces the versatility of the bay. For example, in a cross-connect installation, it is common to have many bays disposed in side-by-side relation. It is desirable for a wire to pass from one bay to other bays in the installation. However, with a bay such as U.S. Pat. Nos. 4,737,985 and 4,649,236, it is impractical or ill advised to extend a wire a distance more than one bay away.

SUMMARY OF THE INVENTION

According to a preferred embodiment of the present invention, a digital signal cross-connect (DSX) bay is disclosed having a cross-connect panel with a plurality of termination points grouped in an array including horizontally spaced apart rows. The areas between the rows define a plurality of horizontal troughs. The termination points of each row are divided into at least two spaced-apart sets defining vertically aligned access gaps in each set. A second trough is provided which is vertically oriented and aligned with the gaps. The vertical trough is offset from the horizontal trough.

BRIEF DESCRIPTION OF THE DRAWINGS

FIG. 1 is a front elevation view, shown partially in section, of a digital signal cross-connect (DSX) bay according to the present invention;

FIG. 2 is a side elevation view of the bay of FIG. 1;

FIG. 3 is a rear elevation view of the bay of FIG. 1;

DESCRIPTION OF THE PREFERRED EMBODIMENT

Figure 4:
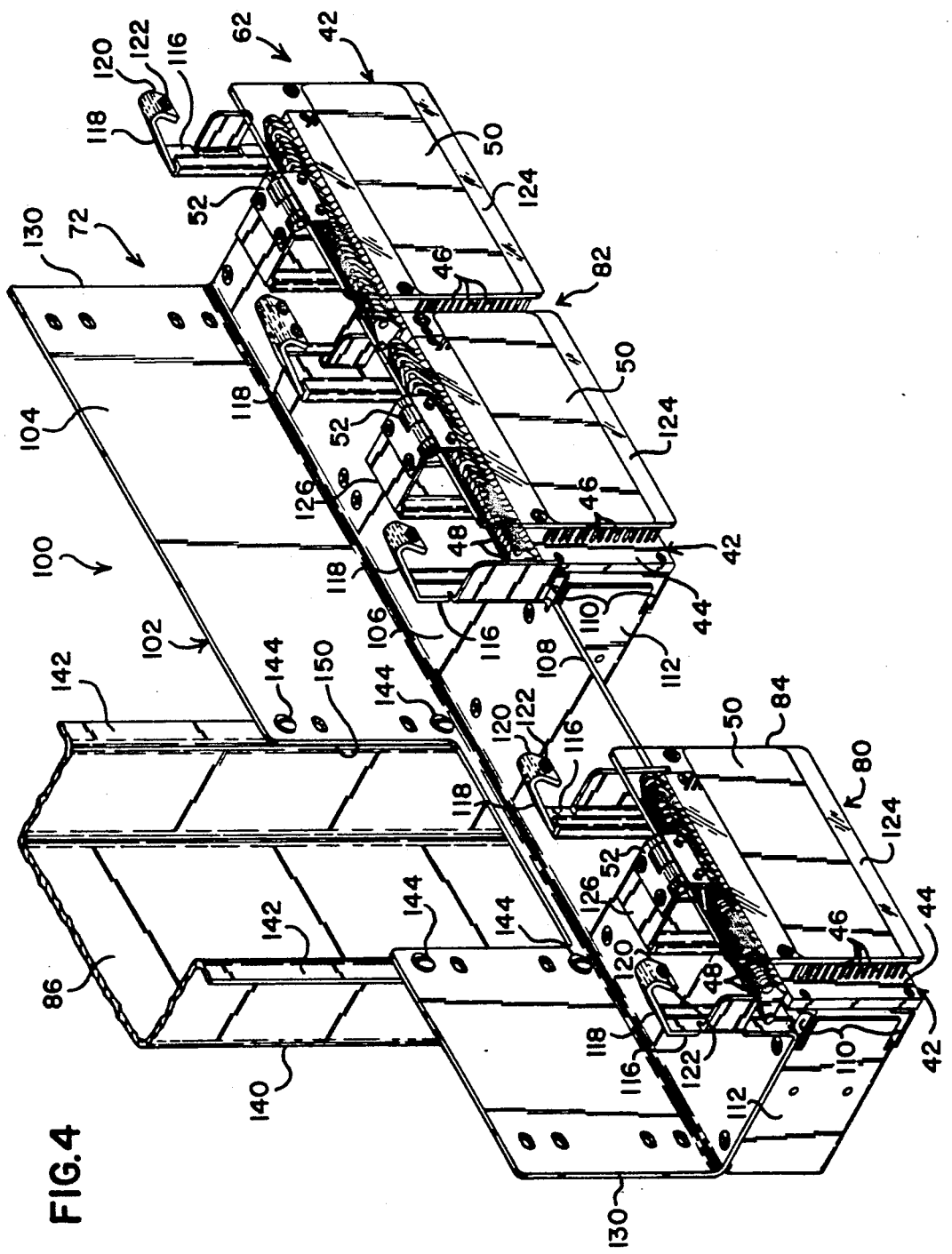
FIG. 4 is a perspective view of a termination point row assembly according to the present invention.

With reference now to the various drawing figures in which identical elements are numbered identically throughout, a description of the preferred embodiment will now be given.

With reference to FIGS. 1-3, a high density digital signal cross-connect (DSX) bay or frame is shown generally at 10. The bay includes a top 12, bottom 14, right side support 16, left side support 18, front face 20 and rear face 22.

The bay includes an upper portion 10a and a lower portion 10b. The upper portion 10a provides for equipment cross-connection.

As shown best in FIG. 3, the upper portion 10a includes a plurality of wire termination blocks 24. Preferred wire termination blocks are the 89 Terminal Block as described in Brochure No. 2182/89 of ADC Telecommunications, Minneapolis, Minn., assignee of the present invention. The termination blocks 24 are disclosed in three vertical columns 25, 26 and 27, with spaces 28 and 29 defined between the columns 25–27 acting as paths for receiving a cable admitted from the top 12 of the bay 10 with wires being terminated at the individual blocks 24. It will be appreciated that the equipment connection portion 10a of the present bay forms no part of this invention per se.

The lower portion 10b of bay 10 includes a jack panel 30 disposed on forward face 20. Jack panel 30 includes a plurality of DSX jack fields 32 which are disposed in stacked horizontal rows, as is conventional.

The back surface 22 of frame 10 in lower portion 12b is a cross-connect panel 40. The cross-connect panel 40 includes a plurality of terminal or connector blocks 42.

Figure 5:
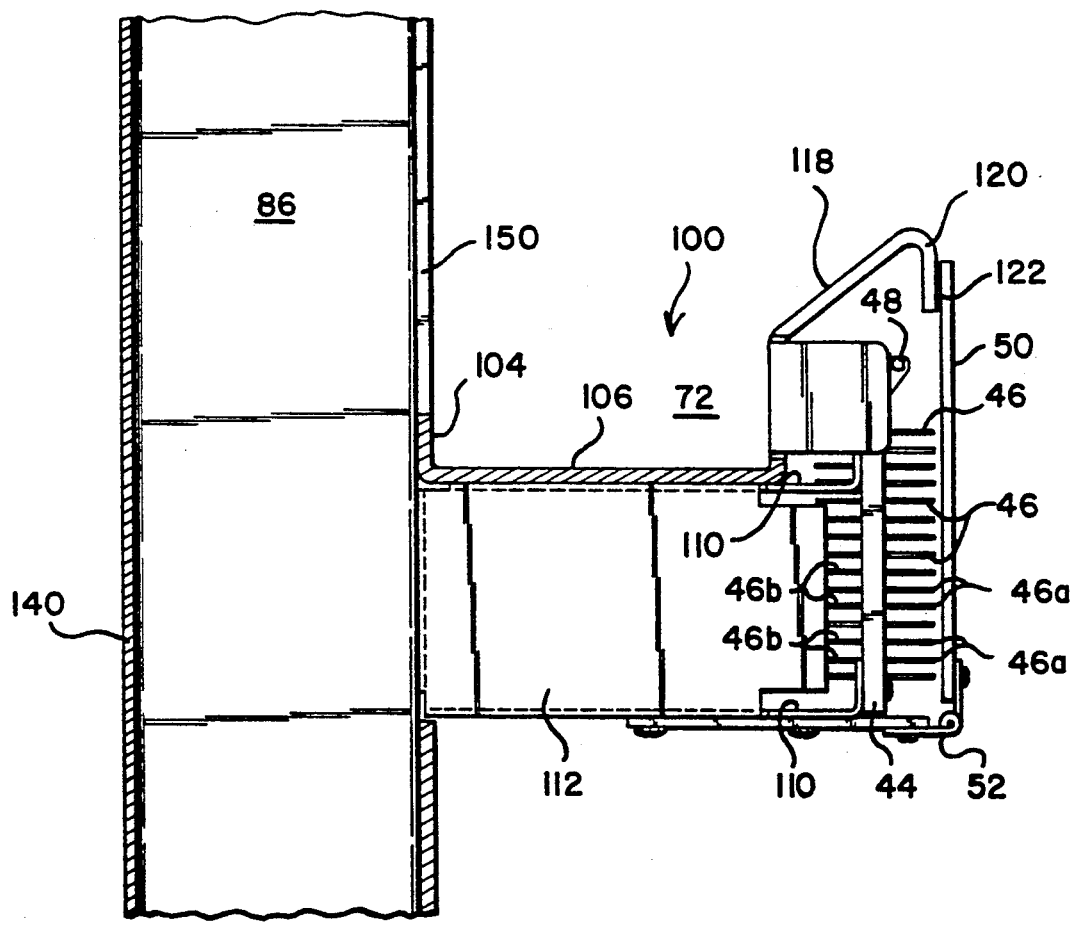
FIG. 5 is a side cross-sectional view of a termination point row assembly according to the present invention.

Shown best in FIGS. 4 and 5, each of blocks 42 is similar to the connector block of the previously mentioned 89 Terminal Block and preferably includes a dielectric plate 44 through which is mounted a plurality of termination pins 46. The block 44 is mounted on the frame 10 so that one end 46a of each of pins 46 is exposed through back side 22 with the other end 46b of the pins housed within the interior of the frame 10 (see FIG. 5). The interior ends 46b of the pins 46 are wired to the jack panels 32. For reasons that will be described, an upper edge of the panels 44 is provided with a plurality of parallel aligned fanning clips 48.

A closure plate 50 is provided connected to plate 44 by hinge mechanism 52 so that the plate 50 will pivot about a horizontal hinge axis between an open position exposing pin ends 46a and a closed position covering pin ends 46a. Closure plate 50 can be used as a designation strip whereby an operator can write information on plate 50. In FIG. 4, plate 50 is shown to hinge upwardly to expose pins 46a. Alternatively, plate 50 could hinge downwardly as shown in FIG. 5.

Shown best in FIG. 3, the plurality of termination blocks 42 are arranged in an array which includes a plurality of spaced-apart, horizontal rows 60–66. Means, which will be more fully described, are provided for defining a plurality of horizontal troughs 70–76 between the horizontal rows 60–66. A main horizontal trough 160 is provided along the bottom 14 of the frame 10 and defined by a channel member 162.

The horizontal rows 60–66 of blocks 42 are divided into two sets including a left set 80 consisting of one block each and a right set 82 consisting of two contiguous blocks 42. Sets 80 and 82 are spaced apart to define an access gap 84.

Means, which will be more fully described, are provided for defining a vertical trough 86 which extends the height of panel 40 in vertical alignment with the vertically aligned gaps 84. The vertical trough 86 is offset from the horizontal troughs 70–76. Troughs 70–76 are parallel aligned in a common plane. Vertical trough 86 is vertical and in a plane behind the plane of troughs 70–76. This alignment is best illustrated with respect to FIG. 4.

FIG. 4 illustrates the means by which the vertical trough 86 and horizontal troughs 70–76 are formed. FIG. 4 shows a module 100 for forming the various horizontal troughs 70–76. It will be appreciated that each of troughs 70–76 is identically formed. Accordingly, FIG. 4 will illustrate the formation of trough 72.

FIG. 4 shows a generally L-shaped bracket 102 which includes a vertical plate 104 and a lower horizontal plate 106. Mounted on a leading edge 108 of lower plate 106 are connecting blocks 42, which are aligned in the horizontal row 62. Blocks 42 are connected to lower plate 106 by mounting brackets 110, which mount the upper edge of blocks 42 adjacent leading edge 108 with fanning clips 48 exposed to channel 72. Side plates 112 cover the side edges of module 100 to prevent exposure to the wiring connecting pins 46b to the jack panels.

As shown in FIG. 4, the leading edge 108 is provided with upwardly projecting fingers 116. The fingers 116 have upwardly and outwardly projecting angled portions 118 which terminate at downwardly projecting lips 120. The lips 120 assist in maintaining closure plates 50 in an open position by providing an adhesive mechanism between lips 120 and plates 50. For example, Velcro ® strips 122 can be placed on lips 120 and be disposed to align with Velcro ® strips 124 on the edges of plates 50 to hold plates 50 in an open position. Also on leading edge 108, vertical posts 126 are provided that carry the hinge elements 52.

As indicated, the opposing surfaces of plates 104 and 106 cooperate to define channel 72, which is restrained by the surfaces of fingers 116 and posts 126. Wires can be held in trough 72 in horizontal alignment, with the fingers 116 acting to assist placement of the wires into the trough 72.

Module 100 is secured to the bay 10 by bolting the side edges 130 of the module to side supports 16, 18 of frame 10. As shown in FIGS. 1 and 2, the side supports 16, 18 provide the intermediate structural support for the frame.

Carried on the frame 10 is a vertical channel 140 which is disposed to lie on a rear edge of module 100 such that the module 100 abuts flanges 142 of channel 140. Plate 104 is fastened to flange 142 by screws 144. Channel 140 defines trough 86 disposed in a plane behind trough 72. An opening 150 is formed in plate 104 to provide cable flow communication between trough 86 and trough 72. The trough 86 and opening 150 are in vertical alignments with the gaps 84 so that an operator can have access to trough 86.

With the arrangement thus described, cross-connect wires run vertically within a bay to vertical channel 86. Also, wires can run horizontally in any of troughs 70–76 and 162. When it is desirable to pass a wire from trough 86 to any of the termination points 42, the wire may be passed from the vertical trough through opening 150 into trough 72 and passed to the desired termination block 42. The fanning clips 48 assist in wire management from trough 72 to the individual termination pins 46. When bays 10 are disposed in side-by-side relation with other bays, the troughs 70–76 and 162 are in horizontal alignment such that wires may run freely in a horizontal manner through troughs 70–76 and 160. No interference is provided by the vertical troughs. Accordingly, a horizontal run is unrestricted between a plurality of side-by-side bays. If desirable to run a plurality of wires from trough 86 to adjacent bays, the wires may be run from trough 86 through to bottom trough 160 and fed to other bays. The wire is then run again in the vertical trough of adjacent bays to a desired horizontal location.

From the foregoing detailed description of the present invention, it has been shown how the invention has been attained in a preferred manner. The present invention provides for a high density DSX bay with enhanced wire management. The enhanced wire management greatly facilitates the development of an installation with a plurality of side-by-side bays. While the foregoing is a detailed description of the preferred embodiment, it will be appreciated that it is not the intent to limit the scope of the invention to the preferred embodiment. Instead, the scope of the invention is intended to be limited only by the scope of the claims which are appended hereto.

What is claimed is:

1. A cross-connect panel for a high density digital signal cross-connect (DSX) bay, said panel comprising:
   (a) a plurality of cross-connect termination points exposed through a face of said panel, said termination points grouped in an array including a plurality of horizontal spaced-apart rows, said rows mutually aligned such that said spaced-apart rows extend substantially the entire width of said cross-connect panel;
   (b) first trough defining means for defining a plurality of substantially horizontal troughs located between opposing rows and extending horizontally across the width of said panel, each of said troughs having a forward portion proximate said rows and a rear portion spaced from said rows;
   (c) said termination points of each row further divided into at least two spaced-apart sets with opposing sets defining an access gap and with an access gap of each set in generally vertical alignment with an access gap of other sets of said panel; and
   (d) second trough defining means for defining a substantially vertical trough extending the height of said panel in vertical alignment with said gaps, said vertical trough disposed offset from said horizontal trough defining means and located proximate said horizontal trough rear portion; and (e) means for providing cable communication between said horizontal trough and said vertical trough.

2. A digital cross-connect pane according to claim 1, wherein each of said rows includes a plurality of independently mounted modular cross-connect blocks.

3. A digital cross-connect panel according to claim 2, wherein said panel further includes directing means for directing cables between one of said horizontal troughs and pre-selected termination points.

4. A digital cross-connect panel according to claim 3, wherein said directing means includes a plurality of fanning clips extending from a top edge of each of said cross-connect blocks, whereby in use, cables are directed from a trough to an adjacent predetermined block, passing between adjacent said fanning clips to selected termination points.

5. A digital cross-connect panel according to claim 2, wherein each of said blocks includes at least two finger members extending from an upper edge of said block, said finger members including a generally vertical portion and an angled portion extending further upward at an angle from said vertical portion toward said panel front side, said finger members adapted to allow placing cables into said troughs, and further adapted to guide wires from one said trough to said connector block.

6. A digital cross-connect panel according to claim 2, wherein each said block includes a closure plate mounted for rotation about a horizontal axis between a first closed position with said closure plate covering said exposed termination points and a second open position allowing access to said points.

7. A digital cross-connect panel according to claim 5, wherein said block includes a closure plate mounted for rotation relative to said panel face plane about a predetermined horizontal axis, to an open position allowing access to termination points; said panel further including means for maintaining said closure plate in said open position.

8. A digital cross-connect panel according to claim 7, wherein said retaining means includes a first engagement member extending from said angled portion of at least one said finger members and a second engagement member extending from said connector block, said first engagement member adapted to engage said second engagement member.

9. A telephone cross-connect distribution frame assembly for cross-connecting digital switching systems, comprising:

(a) a vertical frame having first and second faces;

(b) a jack panel disposed on said first face and presenting a plurality of telephonic communication jacks accessible through said first face;

(c) a cross-connect panel disposed on said second face and including:

(i) a plurality of cross-connect termination points exposed through a face of said panel, said termination points grouped in an array including a plurality of horizontal spaced-apart rows, said rows mutually aligned such that said spaced-apart rows extend substantially the entire width of said cross-connect panel, at least a plurality of said exposed termination points electrically connected to at least a plurality of said jacks;

(ii) first trough defining means for defining a plurality of substantially horizontal troughs located between opposing rows and extending horizontally across the width of said panel, each of said troughs having a forward portion proximate said rows and a rear portion spaced from said rows;

(iii) said termination points of each row further divided into at least two spaced-apart sets with opposing sets defining an access gap and with an access gap of each set in generally vertical alignment with an access gap of other sets of said panel; and (iv) second trough defining means for defining a substantially vertical trough extending the height of said panel in vertical alignment with said gaps, said vertical trough disposed offset from said horizontal trough defining means and located proximate said horizontal trough rear portion; and (v) means for providing cable communication between said horizontal trough and said vertical trough.

10. An assembly according to claim 9 further comprising:

an office equipment connect panel proximate a top portion of said vertical frame and having a plurality of wire termination blocks disposed to receive telephonic communication cables from a top portion of said frame and termination wires from said cable on said blocks.

11. A cable management arrangement in a modular distribution frame assembly having a cross-connect panel including an array of connector blocks grouped in horizontal spaced-apart rows, the rows mutually aligned such the spaced-apart rows extend substantially the entire width of the cross-connect panel, and said connector blocks further grouped in vertical spaced-apart sets, the sets mutually aligned and including at least two connector blocks, said cable management arrangement comprising:

(a) means for defining a horizontal trough located between adjacent rows and extending substantially the entire width of the cross-connect panel, and including a front portion proximate the connector blocks, and an opposite rear portion;

(b) means for defining a vertical trough located in alignment between adjacent sets and extending the height of the cross-connect panel, said vertical trough-defining means lying in a plane parallel to and spaced apart from said horizontal trough-defining means, and said vertical trough-defining means located proximate said rear portion of said horizontal trough-defining means.

* * * * *